M. L. MARTUS.
COTTER PIN.
APPLICATION FILED JUNE 28, 1913.

1,171,740.

Patented Feb. 15, 1916.

Witnesses
Joan L. Morehouse
Ruth M. Worden

Inventor
Martin L. Martus
By Chamberlain & Newman
Attorneys

UNITED STATES PATENT OFFICE.

MARTIN L. MARTUS, OF WATERBURY, CONNECTICUT, ASSIGNOR OF ONE-HALF TO CHARLES B. SCHOENMEHL, OF WATERBURY, CONNECTICUT.

COTTER-PIN.

1,171,740.  Specification of Letters Patent.  Patented Feb. 15, 1916.

Application filed June 28, 1913. Serial No. 776,266.

*To all whom it may concern:*

Be it known that I, MARTIN L. MARTUS, citizen of the United States, and resident of Waterbury, in the county of New Haven and State of Connecticut, have invented certain new and useful Improvements in Cotter-Pins, of which the following is a specification.

My invention relates to improvements in cotter-pins such as are designed to be driven through holes to insure the retention of one part to another, as for instance, to a nut upon a bolt or shaft to which it may be attached.

The purpose of the invention is to provide an improved form of cotter-pin which may be readily manufactured by automatic machinery from half round or other suitable form of wire; to construct it in such a way as to insure it being easily driven into a hole to lock the parts in position as above suggested; further to insure the locking of the pin in such a hole and in a way to prevent its removal from the parts when so placed; and finally to form it in such a way that the parts when so locked will not only hold the nut in position, but will prevent any possible longitudinal movement of the pin thereby avoiding rattle and wear.

Figure 1:
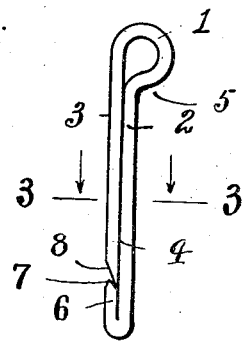
Figure 2:
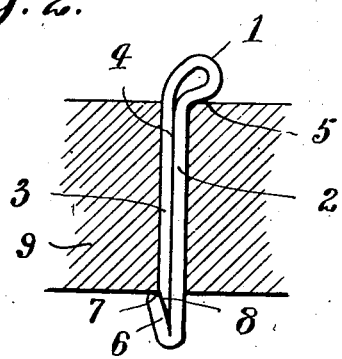
Figure 4:
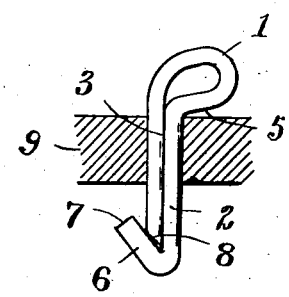
Figure 3:
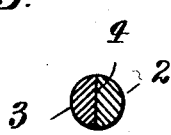

With the above and other objects in view the invention resides and consists in the novel construction and combination of parts shown upon the accompanying sheet of drawings forming a part of this specification and upon which similar characters of reference denote like or corresponding parts throughout the several figures, and of which, Figure 1, shows a side view of my improved form of cotter-pin in its normal position ready for use. Fig. 2, is a similar side view of the cotter-pin positioned in a hole and locked in place, Fig. 3, is an enlarged detail, cross section of the cotter-pin and taken on the line 3—3 of Fig. 1 and Fig. 4, shows a further side view of a cotter-pin formed of oval flat wire and placed in a shaft 9 of less diameter than the length of pin.

As before stated my improved form of cotter-pin is designed to be manufactured upon an automatic wire forming machine from suitable size and shape of wire, which would be first cut into proper lengths from a coil and then bent and formed into shape to produce a complete commercial article as illustrated in Fig. 1 of the drawing. This cotter-pin as will be seen comprises a loop form of head 1 which is formed of substantially the central portion of the wire and further includes shanks 2 and 3 the adjoining sides 4 of which may be flat and are disposed against and parallel to each other. The under portion 5 of the loop of the head is preferably disposed at a right angle to the shank as is clearly shown in Figs. 1, 2 and 4 of the drawings to engage the surface of the member 9 in which the pin is placed and to thereby limit the movement of the long shank. The shank 2 is formed longer than the adjacent shank 3 and its end portion 6 is turned back so that the two portions of the flat side 4 of the wire are laid close together. The extremity 7 of this returned shank 6 is preferably beveled, as shown in Figs. 1 and 2, to form an under bevel cut which serves to insure an operative engagement for the beveled end 8 of the co-acting shank 3 therewith. The end of this shank 8 is thus in alinement with the shank member 3 so that when the latter is driven forward it will crowd in between the main shank 2 and the returned end 7. It will therefore be apparent that the cotter-pin which is of substantially the same size as the hole in which it is to be placed, may readily be slipped in position by hand and then given a light tap upon the head with a hammer. The blows will thus serve to drive then given a light tap upon the head with a end 7 in a way to distend the returned end 6, as shown in Figs. 2 and 4, so as to engage the outside of the shaft 9 through which the pin has been passed. This forms a positive lock which will hold the pin in position. The pin may be removed, however, by first drawing shank 3 outward and then bringing the end 6 back to its original position which leaves the pin free for removal.

While I prefer to form the pin of half round wire, yet other forms of wire may be used, as for instance oval or flat wire as will be obvious. I also find that it is not necessary that both of the abutting ends 7 and 8 should be beveled, though it is necessary to form one beveled at least, see Fig. 4.

Having thus described my invention what I claim and desire to secure by Letters Patent is:—

1. A cotter pin formed of a single piece of wire and comprising two shank portions arranged side by side, one of said shanks being longer than the other and forming a fixed member and having its one end portion turned over and disposed flat against the side of said shank to form the introductory end of the pin, the shorter one of said shanks being movable with respect to the fixed shank and having its end beveled and adapted to be driven in back of the returned end of the longer shank for the purpose of spreading the same, and a loop uniting the shanks and forming a head upon one side of the movable shank and in line with the fixed shank to permit the movable member to be driven in along side of and with respect to the longer shank for the purpose specified.

2. A cotter pin formed of two limbs joined by a loop, one of the limbs being folded back upon itself and the other limb lapping the extreme end of the folded portion of said folded limb intermediate of the length of said pin.

3. A cotter pin formed of a piece of metal bent back upon itself near both ends of the pin, and said metal having beveled and lapping termini intermediate the ends of said pin.

4. A cotter pin formed of a piece of metal bent back upon itself near both ends of the pin one end of the pin forming an offset loop and said metal having lapping oppositely beveled termini intermediate the ends of said pin.

5. A cotter pin formed from a single piece of metal looped intermediate its ends and formed into two parallel limbs, the long limb having an end portion folded back upon itself and the short limb lapping the tip of said folded end portion, whereby a blow on the loop will produce a pin having three thicknesses of metal at one end.

6. A cotter pin adapted to spread transversely intermediate its ends during longitudinal movement of one of its limbs and comprising a loop and substantially parallel limbs of different lengths, with a portion of the long limb folded back upon itself and extending substantially parallel with another portion of the same limb near its end, and the short limb adapted to be driven to position to produce with said long limb three thicknesses of metal transversely of said pin.

Signed at Waterbury, in the county of New Haven and State of Connecticut, this 18th day of June A. D., 1913.

MARTIN L. MARTUS.

Witnesses:
ROSE A. CLARKIN,
VIOLA C. MITCHELL.